United States Patent
Manepalli et al.

(10) Patent No.: US 12,302,100 B2
(45) Date of Patent: *May 13, 2025

(54) IDENTITY AUTHENTICATION USING MOBILE CARRIER ACCOUNT INFORMATION AND CREDIT BUREAU INFORMATION

(71) Applicant: Zumigo, Inc., San Jose, CA (US)

(72) Inventors: Harish Manepalli, San Jose, CA (US); Chirag C. Bakshi, San Jose, CA (US)

(73) Assignee: Zurigo, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,686

(22) Filed: May 7, 2024

(65) Prior Publication Data

US 2024/0292218 A1 Aug. 29, 2024

Related U.S. Application Data

(63) Continuation of application No. 17/458,078, filed on Aug. 26, 2021, now Pat. No. 12,015,918, which is a
(Continued)

(51) Int. Cl.
*H04W 12/06* (2021.01)
*G06Q 20/32* (2012.01)
*G06Q 40/03* (2023.01)
*H04L 9/40* (2022.01)
*H04W 48/08* (2009.01)

(52) U.S. Cl.
CPC ....... *H04W 12/068* (2021.01); *H04L 63/0838* (2013.01); *H04L 63/0884* (2013.01); *H04W 48/08* (2013.01); *G06Q 20/3221* (2013.01); *G06Q 40/03* (2023.01)

(58) Field of Classification Search
CPC .......... H04W 12/068; H04W 48/08; H04L 63/0838; H04L 63/0884
See application file for complete search history.

(56) References Cited

U.S. PATENT DOCUMENTS 10,333,934 B1 * 6/2019 Fox .................. H04L 67/02
10,387,980 B1    8/2019 Shahidzadeh et al.
(Continued)

OTHER PUBLICATIONS

Marforio et al. "Smartphones as Practical and Secure Location Verification Tokens for Payments," NOSS 2014, Feb. 22, 2014, 15 pages.

*Primary Examiner* — Shanto Abedin
(74) *Attorney, Agent, or Firm* — Kim & Stewart LLP

(57) ABSTRACT

A mobile network based authentication system for authenticating a user's access to a restricted-access account includes an application server and an identification server. The application server is configured to authenticate the user's access to the restricted-access account by transmitting a one-time password to a mobile computing device of the user and confirming that the one-time password has been entered by the user. The identification server communicates with the application server after the application server receives a request from the user to access the restricted-access account and before the application transmits the one-time password to the mobile device, to verify that an attribute of the restricted-access account is linked to a network identification of the mobile computing device.

20 Claims, 3 Drawing Sheets

Related U.S. Application Data continuation of application No. 16/201,638, filed on Nov. 27, 2018, now abandoned.

(56) References Cited

U.S. PATENT DOCUMENTS

| | | | |
|---|---|---|---|
| 10,552,823 B1* | 2/2020 | Woodward | G06Q 20/322 |
| 10,778,435 B1* | 9/2020 | Wimberley | H04L 9/3231 |
| 2004/0243832 A1 | 12/2004 | Wilf et al. | |
| 2011/0276495 A1 | 11/2011 | Varadarajan et al. | |
| 2013/0159195 A1* | 6/2013 | Kirillin | H04L 63/105 |
| | | | 705/71 |
| 2013/0173449 A1 | 7/2013 | Ng et al. | |
| 2013/0218769 A1 | 8/2013 | Pourfallah et al. | |
| 2014/0279544 A1 | 9/2014 | Baird et al. | |
| 2015/0269579 A1 | 9/2015 | Subramanian et al. | |
| 2018/0082303 A1 | 3/2018 | Chan-Bauza et al. | |
| 2018/0295514 A1* | 10/2018 | Brown | H04W 12/069 |
| 2019/0036915 A1* | 1/2019 | Burch | G06F 21/45 |
| 2019/0089702 A1* | 3/2019 | Bhatt | H04L 63/0884 |
| 2019/0139024 A1* | 5/2019 | Bakshi | H04W 12/72 |
| 2019/0303371 A1 | 10/2019 | Rowe et al. | |
| 2019/0349373 A1 | 11/2019 | Fox et al. | |

* cited by examiner

IDENTITY AUTHENTICATION USING MOBILE CARRIER ACCOUNT INFORMATION AND CREDIT BUREAU INFORMATION

CROSS-REFERENCE TO RELATED APPLICATIONS

This application is a continuation of U.S. patent application Ser. No. 17/458,078, filed Aug. 26, 2021, which is a continuation of U.S. patent application Ser. No. 16/201,638, filed Nov. 27, 2018, both of which are incorporated by reference herein.

BACKGROUND OF THE INVENTION

Field of the Invention

Embodiments of the present invention generally relate to identity authentication systems and, more specifically, to identity authentication using mobile carrier account information and credit bureau information.

Description of the Related Art

To reset a password for an online bank account or other account associated with sensitive information, it has become common practice to employ possession of a mobile phone that is linked to the account holder as an authentication factor. That is, possession of such a mobile phone can be a credential for the identity of the account holder. For example, when resetting a password for a bank account via an application on a computing device, a user may be required to confirm his or her identity by requesting that a one-time password (OTP) be sent to a smartphone or other mobile device for entry by the user via the computing device. To prevent a fraudster or other unauthorized person from performing an unauthorized password reset, an authorization entity verifies that the mobile number (or network identification) of the mobile device requesting the OTP is actually linked to the holder of the bank account, and notifies the bank accordingly. When the mobile number of the mobile device requesting the OTP is not linked to the holder of the bank account, the authorization entity notifies the bank that the identity of the account holder does not match the identity linked to the mobile number, and the password reset request is rejected and no OTP is sent to the mobile device.

While using an OTP sent to a mobile device as a form of identity authentication provides automated identity authentication for an online password reset, one drawback to this approach is the large number of false rejections that can occur. That is, in many instances, the authorization entity can fail to verify that the mobile number of the mobile device designated for receipt of the OTP is linked to the holder of the bank account, even though the holder of the bank account actually is the user of that mobile device. For example, the mobile number designated for receipt of the OTP may be part of a family or other group mobile service plan, and the holder of the bank account is not the primary user of the mobile service plan. Thus, when an authorization entity attempts to verify that the mobile number of the mobile device designated for receipt of the OTP is associated with the holder of the bank account, the mobile carrier generally returns the name of the primary service plan user rather than the name of the actual user of the mobile device. Because the returned name (i.e., the name of the primary service plan user) does not match the name of the holder of the bank account, the authorization entity rejects the request for transmission of an OTP to the mobile phone designated for receipt of the OTP. As a result, a process involving a phone support call to complete the password reset is initiated, which can be time-consuming and frustrating for the holder of the bank account and costly for the bank. Furthermore, because a high percentage of mobile devices are now included in some sort of family or other group mobile service plan, the above-described false rejection occurs with high frequency.

SUMMARY OF THE INVENTION

According to one or more embodiments, enhanced identity matching via a mobile device, such as a smartphone or other wireless subscriber terminal, is facilitated when a user attempts to access a restricted-access account via a computing device, such as a desktop computer or smartphone. Specifically, the identity of the user can be verified based on a mobile number of a mobile device, personal identifying information provided by the user, user information for the mobile account associated with the mobile number, and user information from a credit bureau. In some of the embodiments, the user information for the mobile account is retrieved from the mobile carrier that provides the mobile account and the user information from the credit bureau is determined based on the user information for the mobile account. Given the above information (i.e., the mobile number of the mobile device, the personal identifying information provided by the user, the user information for the mobile account associated with the mobile number, and the user information from the credit bureau), a mobile device identification server or other authorization entity can verify that the identity of the user attempting to access the restricted-access account matches the identity of the holder of the restricted-access account, even when the holder of the restricted-access account is not the primary name associated with a mobile account for a mobile number used in the verification process. As a result, an OTP can be sent to the mobile number and/or access to the restricted access account can be granted to the user attempting access.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
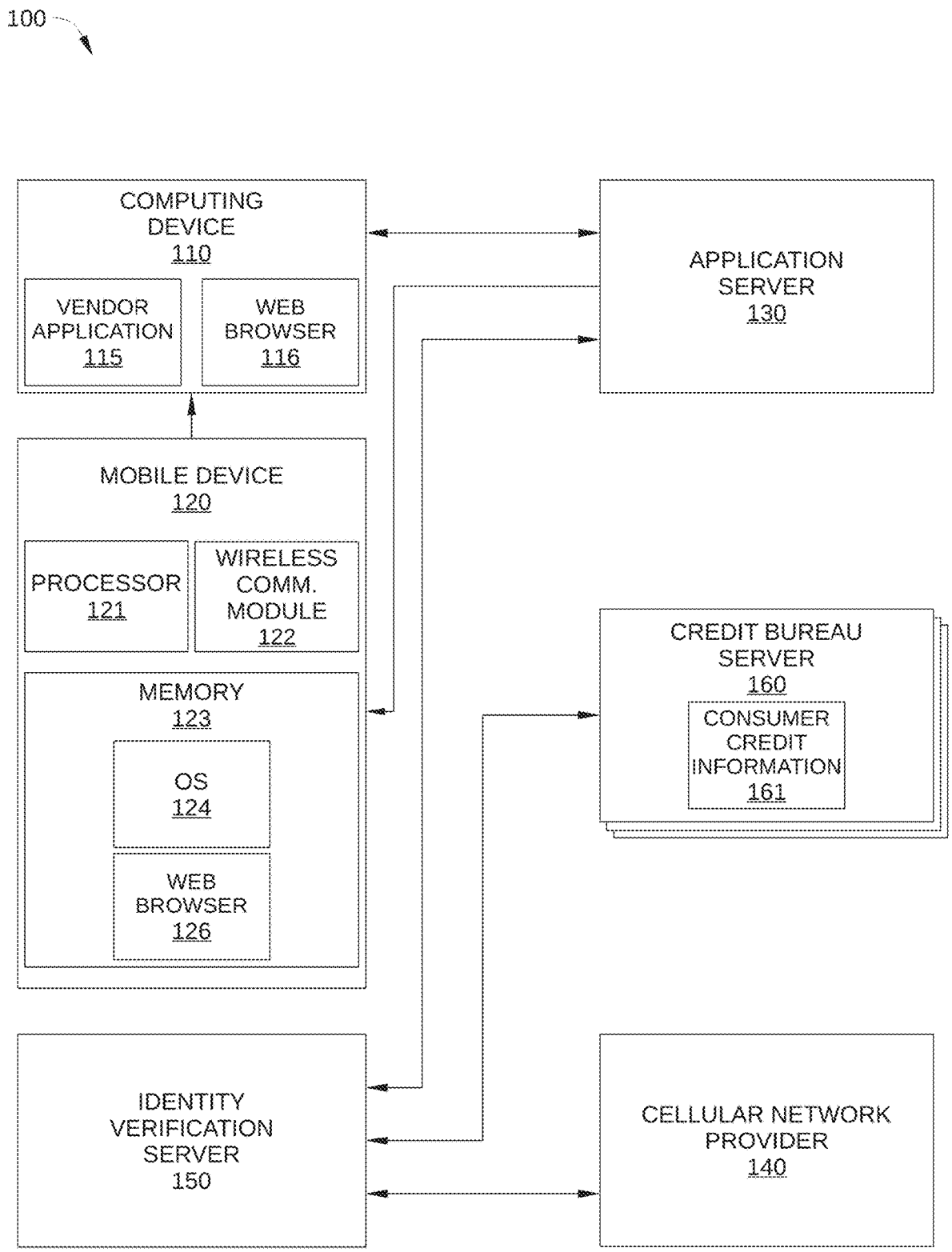
FIG. 1 is a block diagram of a mobile identity verification system, according to one or more embodiments of the present invention.

FIG. 1 is a block diagram of a mobile identity verification system 100, according to one or more embodiments of the present invention. As described below, mobile identity verification system 100 enables verification of the identity based on of a user via a smartphone, wireless subscriber terminal, or other mobile device, even when the user is not the primary user of the mobile account for the mobile device. As a result, when an identity verification server or other authentication entity fails to match the name of the mobile device user with the primary holder of the mobile account as part of the authentication process, the identity verification server can still verify the identity of the user. Specifically, the identity of the user of the mobile device can be verified based on the network identification (ID) of the mobile device, personal identifying information provided by the user, user information for the mobile account associated with the mobile number, and user information from a credit bureau. The network identification ID of a mobile device, as used herein, can include the mobile number or other unique number that is associated with that mobile device and is managed by a cellular network provider. Mobile identity verification system 100 includes a computing device 110, a mobile device 120, an application server 130, a cellular network provider 140, an identity verification server 150, and one or more credit bureau servers 160. Although not shown in FIG. 1, mobile device 120 can be communicatively coupled to application server 130 and/or identity verification server 150 by one or more wireless communication networks, identity verification server 150 can be communicatively coupled to application server 130, cellular network provider 140, and credit bureau servers(s) 160 by one or more wireless communication networks, and computing device 110 can be communicatively coupled to application server 130 by one or more wireless communication networks.

The one or more wireless communication networks connecting the above elements of mobile identity verification system 100 can each include a wireless local area network (WLAN), a cellular network, or a combination of both. The WLAN included in the one or more one or more wireless communication networks enables compatible devices to connect to the Internet via a wireless access point, or "hotspot." For example, in some embodiments, the WLAN is a WiFi network that includes one or more devices based on the Institute of Electrical and Electronics Engineers (IEEE) 802.11 standard. Thus, any suitably configured wireless communication device that can connect to the WLAN, such as a smartphone with WiFi capability, can perform data transfer to and from the Internet. The cellular network included in the one or more wireless communication networks enables two-way wireless communication with wireless subscriber terminals, such as mobile device 120. For example, in some embodiments, the cellular network includes one or more base stations (not shown) that are in two-way wireless communication with wireless subscriber terminals, and with a landline system (not shown), such as the public switched telephone network (PSTN) or any other wired network capable of voice/data connections. When an active call associated with mobile device 120 is underway in the cellular network, a suitable base station translates a forward trunk signal in the landline system to a properly formatted radio signal, which is transmitted by an antenna to mobile device 120 over an air interface. Mobile device 120 performs complementary operations to enable the two-way voice or data traffic over the air interface.

Computing device 110 can be any technically feasible and network-connected computing device. For example, computing device 110 can be a desktop computer, laptop computer, smartphone, personal digital assistant (PDA), tablet computer, or any other type of computing device that is configured to receive input, process data, and display images, and is suitable for practicing one or more embodiments of the present invention. Thus, computing device 110 is configured to execute a vendor application 115, a web browser 116, and/or other software applications. In addition, computing device 110 is configured to communicate with application server 130, for example via a web browser 116.

Vendor application 125 is a computer program designed to run on computing device 120. Vendor application 115 is loaded on computing device 110 and facilitates interactions with a particular website, such as application server 130, a particular database, or some other computing device. For example, in some embodiments, vendor application 115 is a banking application, a navigational program, an application that facilitates online purchasing of entertainment media from a specific website, etc.

Mobile device 120 can be a cellular telephone, a smart phone, a personal digital assistant (PDA), a tablet computer, or any other mobile computing device or wireless subscriber terminal configured to wirelessly access WLANs and cellular networks of mobile identity verification system 100, and to facilitate one or more embodiments of the present invention. To that end, in some embodiments, mobile device 120 includes a processor 121, a wireless communication module 122, and a memory 123. Processor 121 may be any suitable processing unit implemented as a central processing unit (CPU), an application-specific integrated circuit (ASIC), a field programmable gate array (FPGA), any other type of processing unit, or a combination of different processing units. Wireless communication module 122 may be any suitable electronics package and or chipset configured to enable wireless communication with a WLAN and/or cellular network. Thus, in some embodiments, wireless communication module 122 includes cellular capability and WiFi capability, among others. Alternatively or additionally, in some embodiments, wireless communication module 122 includes Bluetooth capability. Memory 123 can include any suitable volatile and/or nonvolatile memory (e.g., random-access memory (RAM), read-only memory (ROM), flash memory, a magnetic hard drive, etc.), and is configured to store instructions, data, an operating system (OS) 124, and/or a web browser 126, etc.

OS 124 supports the functions of processor 121, including scheduling tasks and sending commands to vendor application 125, memory 123, and wireless module 122, managing the power state of mobile device 120, initiating execution of applications on processor 121, managing sockets and TCP connections, and the like. For example, in some embodiments, OS 124 is configured to facilitate the execution of web browser 126, and/or other software applications.

Application server 130 can be any entity that can be accessed by mobile device 120 via WiFi or another communications network and can benefit from identification and/or authorization of a user prior to access by the user. More specifically, application server 130 can be any entity that provides access to a vendor website, a restricted-access account, or other sensitive information. Alternatively or additionally, application server 130 enables important data and/or financial transactions. Application server 130 can be implemented as a website, an application, a server, a database, an application running on an instance of virtual machine, and the like. Thus, in some embodiments, application server 130 is a public or open server, whereas in other embodiments, application server 130 is a restricted-access only server. For example, in some embodiments, application server 130 can be a restricted-access server, a merchant server, a vendor website, an e-mail server or application that enables interaction with an e-mail server, a banking website, a cloud storage server, and the like. Thus, application server 130 can be any computing device, application, or other entity that can be accessed by computing device 110 via web browser 116. As noted above, vendor application 115 is configured to facilitate access to and interactions with application server 130.

In some embodiments, application server 130 stores and/or provides access to sensitive information and/or enables important data and/or financial transactions. As such, user interactions with application server 130, particularly online interactions, generally require authentication of the identity of a user attempting the online interaction. According to various embodiments described below, the identity of a user attempting to access application server 130 via computing device 110 can be verified based on the network ID of mobile device 120, certain personal identifying information provided by the user, user information for the mobile account associated with the network ID, and user information from a credit bureau. In some embodiments, the verified identity of the user can be employed in conjunction with other authentication factors (such as a knowledge factor) as part of a multi-factor authentication process. In other embodiments, the verified identity of the user can be a single authentication factor.

Cellular network provider 140 represents one or more computing devices or servers included in cellular network 102 that are employed by the provider of cellular network 102 for communicating control, status, and signaling information between nodes in cellular network 102. In some embodiments, cellular network provider 140 is included in a Signaling System 7 (SS7) network. In some embodiments, cellular network provider 140 includes the capability of cellular network 102 to allocate Internet protocol (IP) addresses to mobile devices 120 and to map currently allocated IP addresses to the network IDs of mobile devices 120. In some embodiments, cellular network provider 140 can be determined for a particular mobile device 120 based on the network ID or Mobile Directory Number (MDN) of the mobile device 120. The MDN for a mobile device is generally the 10-digit telephone number that is dialed to reach a CDMA or TDMA mobile device.

Each credit bureau server 160 includes one or more computing devices, servers, and/or databases associated with a particular credit reporting agency, for example Equifax, Experian, or TransUnion. Such credit reporting agencies are companies that collect and maintain consumer credit information 161 for individuals, including personal identifying information, (such as name, date-of-birth, social security number, etc.), historical information, such as residence address history and credit history, and the like. It is noted that the residence address history included in consumer credit information 161 enables the association of different individuals who currently live in, or have previously lived in, the same household. That is, when a first individual and a second individual both live at the same residence address, the assumption is generally held that these two individuals live in the same household, and are associated with each other in this way. According to various embodiments described herein, the shared household association between two such individuals enables identity verification server 150 to verify the identity of one of the individuals when that individual is a user of a mobile device but is not the primary user of the mobile service plan for the mobile device.

Identity verification server 150 may be an application that runs on a server or other computing device coupled to the Internet or other communications network, and is configured to execute identity verification operations as described herein. Such operations can include interfacing with application server 130, cellular network provider 140 and/or one or more credit bureau servers 160, and determining whether a user name associated with mobile device 120 matches a user name associated with a restricted-access account associated with application server 130. The operations of identity verification server 150 are described below in conjunction with FIGS. 2 and 3.

Figure 2:
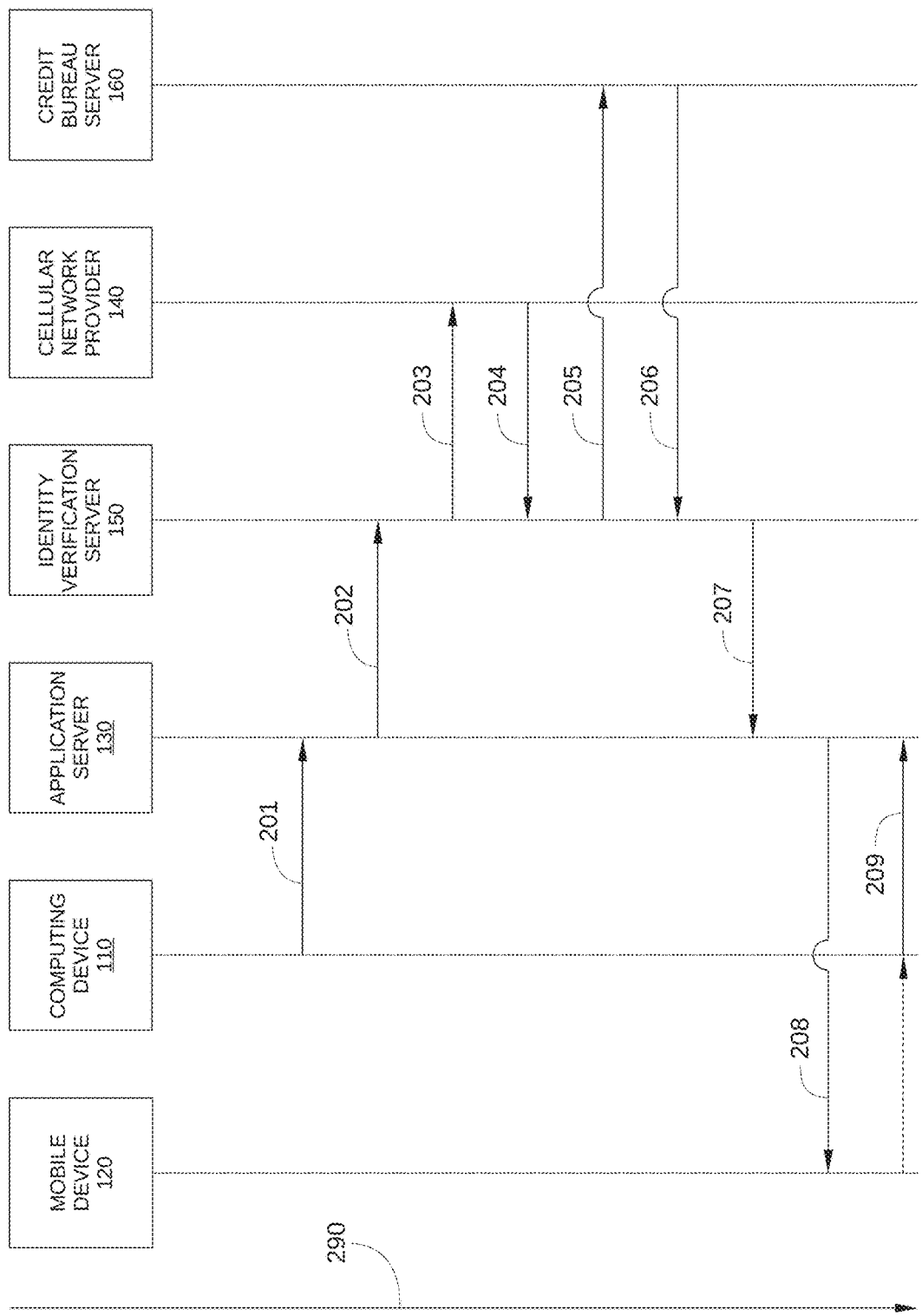
FIG. 2 schematically illustrates the steps performed by the mobile identity verification system of FIG. 1 as the steps occur sequentially along a time line, according to one or more embodiments of the invention.

FIG. 2 schematically illustrates the steps performed by mobile identity verification system 100 as the steps occur sequentially along a time line 290, according to one or more embodiments of the invention. As described above, mobile identity verification system 100 enables electronic verification that the identity of the user of a mobile device 120 matches the identity of a holder of a restricted-access account being accessed by the mobile device 120, for example when a user attempts to access application server 130 via computing device 110. Thus, the matching of these two identities can serve as an authentication factor for authorizing user activity associated with accessing application server 130.

When a user of computing device 110 attempts to initiate an online transaction or otherwise interact with application server 130, vendor application 115 (or web browser 116) transmits a login request 201 to application server 130 in order to login or otherwise access application server 130. For example, after a connection is established between mobile device 120 and application server 130, a user may select an icon displayed on a display device of computing device 110 to initiate login request 201. The icon may be displayed by, for example, vendor application 115 or web browser 116 that is connected to application server 130.

Upon receipt of login request 201, application server 130 then transmits a request for identity verification request 202 to identity verification server 150. Request for identity verification request 202 generally includes the name of the holder of the restricted-access account being accessed by computing device 110, the mobile number or other network ID of a mobile device associated with the restricted access account (e.g., mobile device 120), and information provided by the user of mobile device 120. In some embodiments, provision of information by the user can be prompted by vendor application 115 or web browser 116, and such information includes personal identifying information associated with the user, such as a name of the user, a date of birth of the user, a social security number (or portion thereof) of the user, and the like.

Upon receipt of request for identity verification request 202, identity verification server 150 determines the cellular network provider 140 that manages the network ID referenced in request for identity verification request 202, and transmits a user profile information request 203 to that cellular network provider 140. In some embodiments, the user profile information request 203 includes a request for the name and address of the primary user of the mobile account associated with the mobile number or other network ID referenced in request for identity verification request 202. In some embodiments, the user profile information request 203 further includes a request for the name and address of a secondary user of the mobile account associated with the network ID, when such information is available.

Identity verification server 150 receives user account information 204 from cellular network provider 140. User account information 204 includes, for the mobile account associated with the network ID, a mobile account user name (the name of the primary mobile account user) and a mobile account user address. Identity verification server 150 then transmits a request for an associated user name 205 to at least one of credit bureau servers 160. Request for an associated user name 205 includes some or all of user account information 204 and some or all of the information included in login request 201. For example, in some embodiments, request for an associated user name 205 includes the address information from user account information 204 and the personal identifying information included in login request 201, such as a name of the user, a date of birth of the user, the last four digits of the social security number of the user, and the like.

Based on the information included in request for an associated user name 205 and on consumer credit information 161, the one or more credit bureau servers 160 determine the name of an individual for whom a credit history is available that meets certain criteria, and returns associated user name 206. Specifically, the one or more credit bureau servers 160 may each determine the name of an individual that 1) matches the personal identifying information (from login request 201) and 2) is associated with the address information (from user account information 204). It is noted that the address information provided to a credit bureau server 160 is that of the primary user of the mobile account associated with the network ID referenced in identity verification request 202. Therefore, the name determined by a credit bureau server 160 is that of an individual who is in the same household as the primary user of the mobile account associated with the network ID. The one or more credit bureau servers 160 then transmit the name of such an individual to identity verification server 150 as associated user name 206. In sum, given the input of personal identifying information (originating from login request 201) and address information for a primary account user (provided by cellular network provider 140), a credit bureau server 160 searches for a name of a person associated with the address information, but who has different personal identifying information than that of the primary account user.

Upon receiving associated user name 206, identity verification server 150 then determines whether the name of the individual included in associated user name 206 matches the name that is associated with the restricted-access account being accessed by computing device 110. That is, identity verification server 150 determines whether the associated user name determined by the one or more credit bureau servers 160 matches the account holder name included in identity verification request 202. When these names match, identity verification server 150 transmits an identity verification 207 to application server 130.

Upon receiving identity verification 207, application server 130 transmits an OTP 208 to the mobile device 120 referenced in identity verification request 202, such as the mobile number or other network ID of a mobile device 120 linked to the restricted access account associated with application server 130. The user of mobile device 120 can then enter OTP 208, for example via web browser 116 of computing device 110. The OTP is transmitted by computing device 110 as a password entry 209 to application server 130. Receipt of password entry 209 from the mobile device 120 that is linked to the restricted access account associated with application server 130 satisfies an authorization factor for access to the account, and the user of computing device 110 can thenceforth interact with application server 130 normally.

Alternatively, in some embodiments, upon receipt of associated user name 206, identity verification server 150 transmits associated user name 206 to application server 130, and application server 130 then determines whether the associated user name 206 determined by the one or more credit bureau servers 160 matches the account holder name. In such embodiments, identity verification request 202 may not include the account holder name for the restricted-access account being accessed by the mobile device 120, since application server 130 checks for the match of user name 206 and the name that is associated with the restricted-access account.

Figure 3:
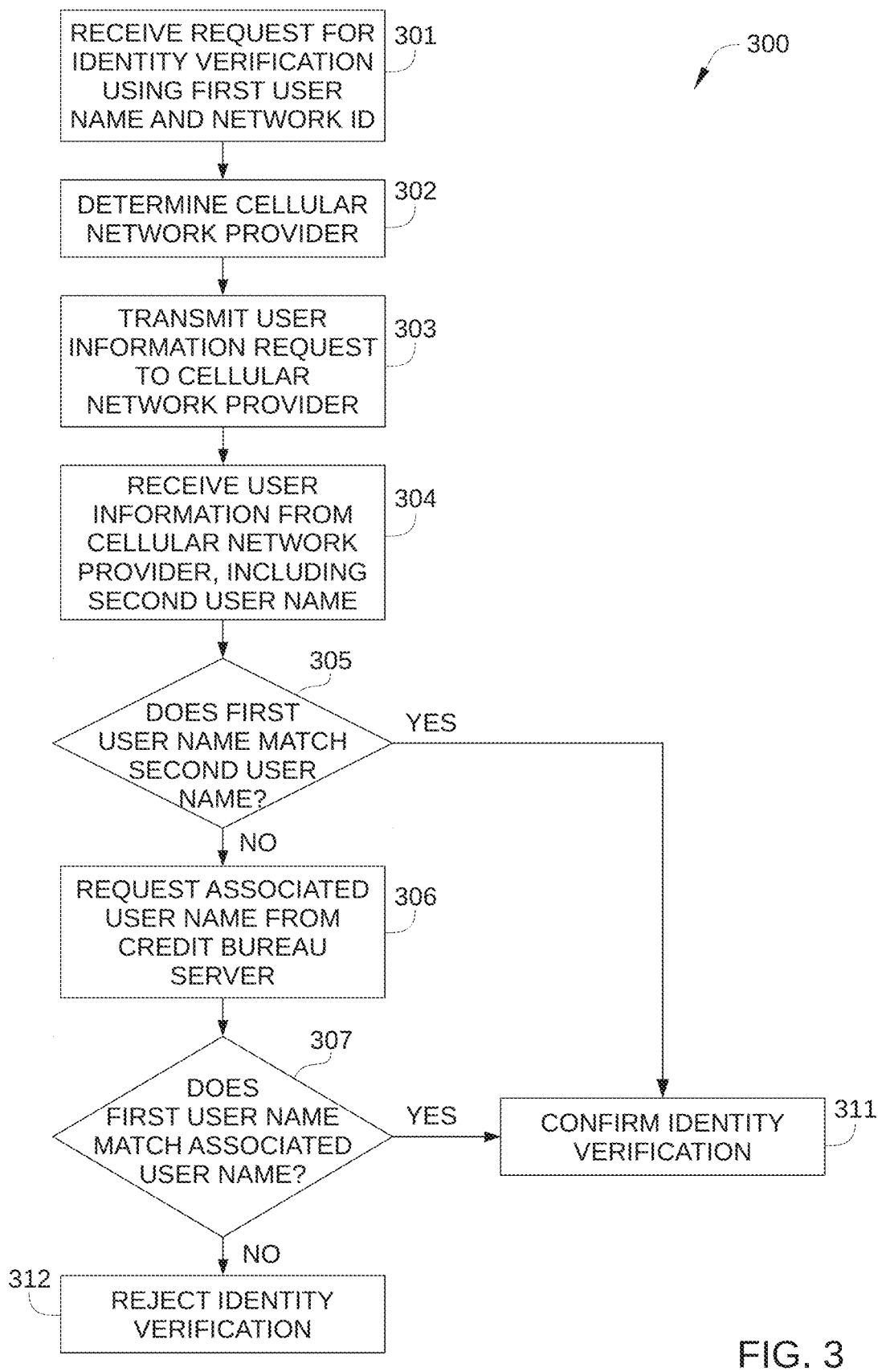
FIG. 3 is a flowchart of method steps for identity verification based on a network ID of a mobile device, according to one or more embodiments of the invention.

FIG. 3 is a flowchart of method steps for identity verification based on a network ID of a mobile device, according to one or more embodiments of the invention. Although the method steps are described in conjunction with mobile identity verification system 100 of FIG. 1, persons skilled in the art will understand that the method steps may be performed with other suitable systems. In the embodiment described in conjunction with FIG. 3, the method steps are performed by identity verification server 150, but in other embodiments, the method steps can be performed by any other suitable computing device included in mobile identity verification system 100, or by a combination of multiple computing devices included in mobile identity verification system.

As shown, a method 300 begins at step 301, where identity verification server 150 receives identity verification request 202 from application server 130, using a first user name and a network ID. The first user name is the name of a user requesting access to a restricted-access account associated with application server 130 via computing device 110 and the network ID is the network ID of a mobile device linked or otherwise associated with the account. That is, identity verification server 150 is requested to verify that the name of the current user of computing device 110 and a mobile device 120 programmed with the network ID matches the first user name, which is the name of the holder of the restricted-access account associated with application server 130 that is being accessed by the user via computing device 110. As noted above, identity verification request 202 generally includes the first user name, personal identifying information, and a mobile number or other mobile device network ID of a mobile device 120. The first user name is the name of the holder of the restricted-access account, the personal identifying information is typically entered by the user with computing device 110, and the mobile device network ID is the mobile number or network ID of the mobile device 120 that is associated with the restricted-access account.

In step 302, identity verification server 150 determines the cellular network provider 140 that manages the network ID referenced in identity verification request 202. In some embodiments, identity verification server 150 includes a database that includes a mapping of network IDs to the different cellular network providers 140, where the mapping enables the determination of a cellular network provider 140 based on a network ID.

In step 303, identity verification server 150 transmits user profile information request 203 to the cellular network provider 140 determined in step 302. User profile information request 203 includes the network ID included in identity verification request 202.

In step 304, identity verification server 150 receives user information 204 from cellular network provider 140, where user information 204 includes a second user name and mobile account user address information. The second user name is generally the name of the primary mobile account user for the mobile account associated with the network ID, and the mobile account user address is the address associated with the mobile account that includes the network ID of mobile device 120.

In step 305, identity verification server 150 determines whether the first user name (from identity verification request 202) matches the second user name (from user information 204). If yes, method 300 proceeds to step 311; if no, method 300 proceeds to step 306. It is noted that when user information 204 includes the user name of the primary user of the mobile account associated with the network ID, and the user of mobile device 120 attempting to initiate an online transaction or otherwise interact with application server 130 is a secondary user of that mobile account, the second user name will not match the first user name, even though the user of mobile device 120 is the authorized account holder of the restricted-access account. As a result, when the user of mobile device 120 attempts to initiate the online transaction (for example via computing device 110), a conventional identity verification server will reject the identity authorization in step 305, and the authorized account holder will be involved in a phone support call to complete the current online transaction. By contrast, according to various embodiments described herein, an associated user name (i.e., a user name that is associated with the mobile account user address) can be determined based on historical credit bureau information, and employed in an additional identity verification process by identity verification server 150, as set forth below.

In step 306, which is performed in response to identity verification server 150 determining that the first user name does not match the second user name in step 305, identity verification server 150 requests an associated user name from one or more credit bureau servers 160. The associated user name is a name that is associated with the mobile account user address received from cellular network provider 140 in step 304. Thus, in step 306, identity verification server 150 transmits request for an associated user name 205 to credit bureau server(s) 160. As noted above, in some embodiments, request for an associated user name 205 includes address information received from cellular network provider 140 and personal identifying information included in login request 201. Identity verification server 150 then receives associated user name 206 from credit bureau server(s) 160.

In step 307, identity verification server 150 determines whether the first user name (from identity verification request 202) matches the associated user name (from associated user name 206). If yes, method 300 proceeds to step 311; if no, method 300 proceeds to step 312.

In step 311, which is performed in response to identity verification server 150 determining that the first user name matches the second user name in step 305, or the first user name matches associated user name in step 307, identity verification server 150 confirms the identity verification requested in step 301. Thus, in step 311, identity verification server 150 transmits an identity verification 207 to application server 130 indicating that the network ID from identity verification request 202 is linked to the first user name. That is, the name of the current user of mobile device 120 matches the name of the holder of the restricted-access account associated with application server 130. As a result, application server 130 can safely transmit an OTP to the mobile number provided in identity verification request 202. When the OTP is received by application server 130 from that mobile number, the user of mobile device 120 can interact with application server 130 normally.

In step 312, which is performed in response to identity verification server 150 determining that the first user name does not match the associated user name in step 307, identity verification server 150 rejects the identity verification requested in step 301. Thus, in step 312, identity verification server 150 transmits an identity verification 207 to application server 130 indicating that the name of the current user of mobile device 120 does not match the name of the holder of the restricted-access account associated with application server 130. As a result, the interaction with application server 130 by the user of mobile device 120 is terminated.

In sum, embodiments described herein enable enhanced identity matching via a mobile device, such as a smartphone or other wireless subscriber terminal, when a user attempts to access a restricted-access account via a smartphone. The identity of the user can be verified based on the mobile number of the smartphone, personal identifying information provided by the user, user information for the mobile account associated with the mobile number, and user information from a credit bureau. In some of the embodiments, the user information for the mobile account is retrieved from the mobile carrier that provides the mobile account, and the user information from the credit bureau is determined based on the user information for the mobile account.

While the foregoing is directed to embodiments of the present invention, other and further embodiments of the invention may be devised without departing from the basic scope thereof, and the scope thereof is determined by the claims that follow.

We claim:

1. An identification server including a physical processor and memory, wherein the physical processor authenticates an account holder's access to a restricted-access account of an application server, by performing the following steps:

receiving from the application server, a request to verify the account holder's identity, the request to verify the account holder's identity including (1) the name of the account holder and (2) a network identifier (ID) associated with the restricted-access account; and in response to receiving the request to verify the account holder's identity:

identifying (1) a name of a primary user of a mobile service plan associated with the network ID and (2) a physical address associated with the primary user of the mobile service plan;

determining that the name of the account holder does not match the name of the primary user of the mobile service plan;

in response to determining that the name of the account holder does not match the name of the primary user of the mobile service plan, transmitting to a credit bureau server, a request for at least one name of a person associated with the physical address;

upon receiving from the credit bureau server, a name associated with the physical address, determining that the name received from the credit bureau server matches the name of the account holder; and in response to determining that the name received from the credit bureau server matches the name of the account holder, transmitting to the application server, verification of the account holder's identity, the transmitting of the verification causing a one-time password to be transmitted to a first device of the account holder to be returned by a second device of the account holder.

2. The identification server of claim 1, wherein the steps further include:
in response to determining that the name of the account holder does not match the name of the primary user of the mobile service plan, transmitting to the credit bureau server, personal identifying information associated with the restricted-access account, wherein the name received from the credit bureau server is associated by the credit bureau server with both the physical address and the personal identifying information, based on credit history information.

3. The identification server of claim 1, wherein the steps further include:
determining a mobile carrier that manages the mobile service plan and then transmitting, to a server of the determined mobile carrier, a request for the name of the primary user of the mobile service plan and for the physical address.

4. The identification server of claim 1, wherein the first device and the second device are the same device.

5. The identification server of claim 1, wherein the first device and the second device are separate devices.

6. The identification server of claim 1, wherein the steps further include:
receiving the request to verify the account holder's identity in response to an access request involving the restricted-access account.

7. An identification server including a physical processor and memory, wherein the physical processor prevents fraudulent access to a restricted-access account of an application server, by performing the following steps:
receiving from the application server, a request to verify an account holder's identity, the request to verify the account holder's identity including (1) the name of the account holder and (2) a network identifier (ID) associated with the restricted-access account; and
in response to receiving the request to verify the account holder's identity:
identifying (1) a name of a primary user of a mobile service plan associated with the network ID and (2) a physical address associated with the primary user of the mobile service plan;
determining that the name of the account holder does not match the name of the primary user of the mobile service plan;
in response to determining that the name of the account holder does not match the name of the primary user of the mobile service plan, transmitting to a credit bureau server, a request for at least one name of a person associated with the physical address;
upon receiving from the credit bureau server, a name associated with the physical address, determining that the name received from the credit bureau server does not match the name of the account holder; and
in response to determining that the name received from the credit bureau server does not match the name of the account holder, transmitting to the application server, a message indicating that the name received from the credit bureau server does not match the name of the account holder, the transmitting of the message preventing a one-time password from being transmitted to a first device of the account holder.

8. The identification server of claim 7, wherein the steps further include:
determining a mobile carrier that manages the mobile service plan and then transmitting, to a server of the determined mobile carrier, a request for the name of the primary user of the mobile service plan and for the physical address.

9. The identification server of claim 7, wherein the steps further include:
causing an interaction with the application server to be terminated.

10. The identification server of claim 7, wherein the steps further include:
receiving the request to verify the account holder's identity in response to an access request involving the restricted-access account.

11. A method for authenticating an account holder's access to a restricted-access account of an application server, the method comprising:
receiving from the application server, a request to verify the account holder's identity, the request to verify the account holder's identity including (1) the name of the account holder and (2) a network identifier (ID) associated with the restricted-access account; and
in response to receiving the request to verify the account holder's identity:
identifying (1) a name of a primary user of a mobile service plan associated with the network ID and (2) a physical address associated with the primary user of the mobile service plan;
determining that the name of the account holder does not match the name of the primary user of the mobile service plan;
in response to determining that the name of the account holder does not match the name of the primary user of the mobile service plan, transmitting to a credit bureau server, a request for at least one name of a person associated with the physical address;
upon receiving from the credit bureau server, a name associated with the physical address, determining that the name received from the credit bureau server matches the name of the account holder; and
in response to determining that the name received from the credit bureau server matches the name of the account holder, transmitting to the application server, verification of the account holder's identity, wherein the transmitting of the verification causes a one-time password to be transmitted to a first device of the account holder to be returned by a second device of the account holder.

12. The method of claim 11, further comprising:
in response to determining that the name of the account holder does not match the name of the primary user of the mobile service plan, transmitting to the credit bureau server, personal identifying information associated with the restricted-access account.

13. The method of claim 12, wherein the name received from the credit bureau server is associated by the credit bureau server with both the physical address and the personal identifying information, based on credit history information.

14. The method of claim 12, wherein the personal identifying information includes at least one of the name of the account holder, a date of birth of the account holder, a social security number (SSN) of the account holder, and a portion of the SSN.

15. The method of claim 11, further comprising:
determining a mobile carrier that manages the mobile service plan and then transmitting, to a server of the determined mobile carrier, a request for the name of the primary user of the mobile service plan and for the physical address.

16. The method of claim 15, further comprising:
receiving the name of the primary user of the mobile service plan and the physical address from the server of the determined mobile carrier in response to the request for the name of the primary user of the mobile service plan and for the physical address.

17. The method of claim 11, wherein the first device and the second device are the same device.

18. The method of claim 11, wherein the first device and the second device are separate devices.

19. The method of claim 11, further comprising:
receiving the request to verify the account holder's identity in response to an access request involving the restricted-access account.

20. The method of claim 11, wherein the network ID is a phone number of a mobile device.

* * * * *